Figure 1:
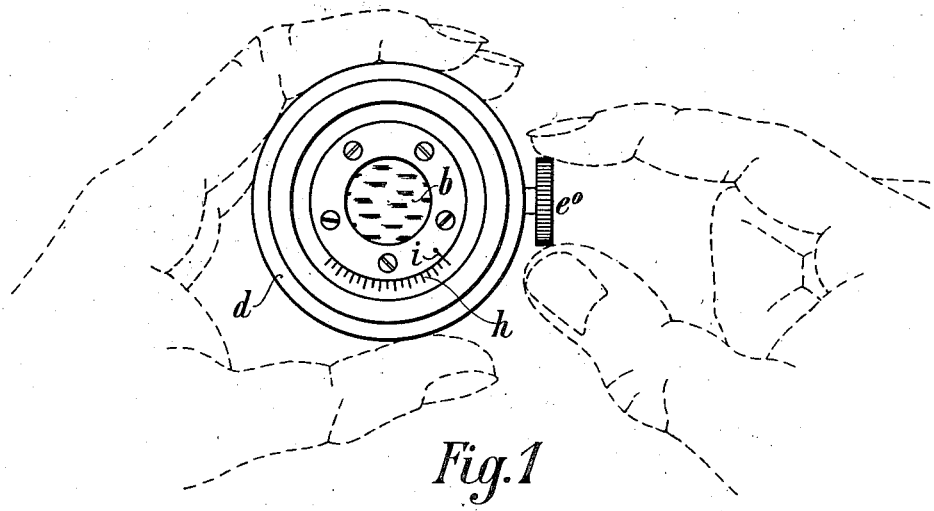

A. KÖNIG.
ANGLE MEASURING APPLIANCE.
APPLICATION FILED OCT. 4, 1907.

942,393.

Patented Dec. 7, 1909.

Witnesses:
Paul Krüger
Fritz Sander

Inventor:
Albert König

UNITED STATES PATENT OFFICE.

ALBERT KÖNIG, OF JENA, GERMANY, ASSIGNOR TO FIRM OF CARL ZEISS, OF JENA, GERMANY.

ANGLE-MEASURING APPLIANCE.

942,393.

Specification of Letters Patent. Patented Dec. 7, 1909.

Application filed October 4, 1907. Serial No. 395,908.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Angle-Measuring Appliance, of which the following is a specification.

The invention relates to double image angle-measuring appliances in which the combination of prisms known as the Rochon prism is employed. This combination consisting of two or more prisms, of which one at least is a double refracting crystal, for example, calcite, is as is well known arranged, so that to one incident ray two emerging rays correspond, the directions of which differ by a certain angle, say $w$, and of the two deflections of which from the direction of incidence even the larger deflection is in general smaller than the angle of separation $w$ and in no case much larger.

Double image angle-measuring appliances are ordinarily employed to determine the distance of objects of which at least one dimension perpendicular to the direction of vision is known to the observer. In these appliances the distance between the double images of such an object can be micrometrically made equal to the said dimension and then the angle subtended by the dimension read off. Angle and dimension together allow of the distance of the object being calculated. When a Rochon prism is made use of for producing the double images, the appliance consists of a telescope, between the objective and the image field of which the prism is slidably fitted, the distance between the double images being the larger the less the prism is distant from the objective.

The object of the present invention is to make use of the properties of the Rochon prism for constructing a double image angle-measuring appliance without the aid of a telescopic system. But it will be understood that such an appliance may serve as an adjunct to telescopes. In this case it is fixed either before the objective or behind the ocular.

The inventive idea has arisen from the following reflections. If in looking through a Rochon prism a certain point, say $A'$, of one of the double images coincides with another certain point, say $B'$, of the other double image, the corresponding object points $A$ and $B$, when viewed direct, lie apart from each other by the angle of separation $w$ of the Rochon prism. If the Rochon prism had an angle of separation arbitrarily alterable from zero to a maximum value, with such a prism evidently the angle subtended by the well-known dimension of any object whatever up to the maximum angle of separation could be measured according to the coincidence method just set forth, that is to say, it would be suitable to serve by itself for determining the distance of objects. A double image angle-measuring appliance, in which Rochon prisms are made use of and in which such alterable angle of separation is produced, forms the subject matter of the present invention. To explain this appliance it may in the first place be brought to mind, that two glass wedges inserted one behind the other, when rotated about the incident ray through equal angles in opposite directions, are equivalent to a stationary wedge having a refracting angle variable with the amount of rotation and producing a variable deflection corresponding to this angle. If the glass wedges be substituted by Rochon prisms, then in rotation the deflection of either of the two emerging rays from the direction of incidence is varied and hence, in general, the angle of separation is changed. There arise, however, in general, still two secondary emerging rays of other directions, because the planes of polarization of the rays proceeding from the first Rochon prism do not always coincide with the principal planes of the second so that each ray is once again decomposed into two rays. To do away with these disturbing secondary rays a circularly polarizing double refracting crystal plate, for example, a disk of mica, is firmly connected with each Rochon prism on the side turned to the other prism. The two rays are circularly polarized after emergence from the first prism by its suitably orientated crystal plate. After this the two rays are always rectilinearly polarized by the other crystal plate orientated to the second Rochon prism, however may be the angular position of this plate relatively to the first plate, so that the planes of polarization coincide with the principal planes of the second prism, further decomposition of the two rays through the second prism thus being prevented.

Figure 2:
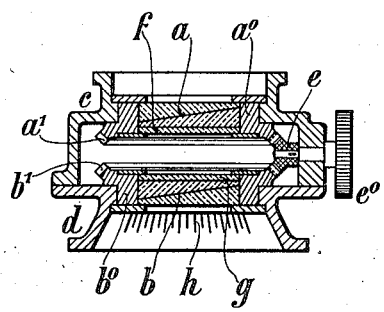
Figure 3:
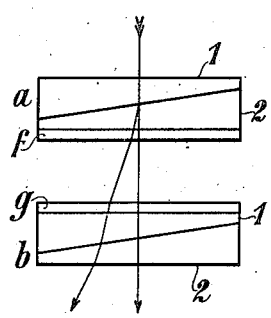
Figure 4:
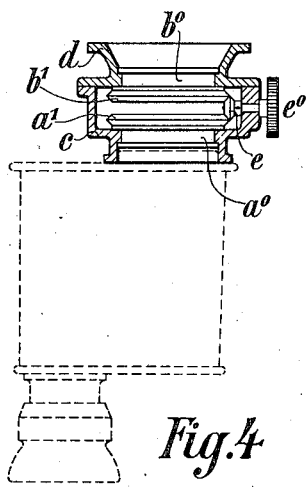

In the annexed drawing: Figure 1 is a front view of an appliance according to the invention, its handling in both hands as a self-contained instrument being indicated by dotted lines. Fig. 2 is an axial section through the same appliance. Fig. 3 is a diagram repeating the optical parts from Fig. 2 and showing the path of the rays. Fig. 4 is a sectional plan view of the appliance of Fig. 2 on a smaller scale and in an inverted position, the appliance being slipped over the objective casing of a prism telescope shown in dotted lines.

The two Rochon prisms $a$ and $b$ are rotatable by means of their mounts $a^0$ and $b^0$, the former in the casing part $c$, the second in the casing part $d$. The mounts are provided with bevel wheels $a^1$ and $b^1$. A bevel wheel $e$, which can be rotated by the milled head $e^0$, gears into the bevel wheels $a^1$ and $b^1$, which are equal in size, and produces equally large, but opposite, rotation of the prisms. The prism $a$ is equipped with a mica or other double refracting plate $f$, the prism $b$ with a similar one $g$. On the inner conical surface of the casing part $d$ the scale of angles $h$ and on the cover ring of the mount $b^0$ the index $i$ (Fig. 1) is arranged. For rotating the prisms in opposite directions, but with equal angular velocity, any other mechanical coupling may be made use of. The measuring appliance proper may be executed in any other less simple form.

The Rochon prisms $a$ and $b$ consist each of a calcite prism 1 (Fig. 3) and a glass prism 2. A ray incident normally on the outer surface of the component 1 of the Rochon prism $a$, on passing through the interface between the components 1 and 2, is split up into two partial rays. One of these partial rays is supposed to retain the direction of the incident ray on account of the refractive index chosen for the component 2. The Rochon prism $b$ having the same construction as $a$, this first partial ray passes unbroken through the whole appliance. The other partial ray is deflected away from the edge of the component 1, but its passage from the component 2 to the mica plate $f$ is unaccompanied by a noticeable deviation. On emerging from the plate $f$ the second partial ray is further deflected and the angle between the two partial rays thereby enhanced, but this additional deflection is annulled when the ray enters the mica plate $g$. The Rochon prism $b$ has a like influence on the second partial ray as $a$, the ray being further deflected on passing from the calcite component 1 to the glass component 2 and once more on emerging from the latter component. The final angle between the two partial rays is varied, as above explained, by compensatory rotations of the two optical members $a\,f$ and $g\,b$ of the appliance, the position of the members as shown in Figs. 2 and 3 corresponding to the maximum angle.

I claim:

A double image angle-measuring appliance, consisting of two Rochon prisms, two circular polarizing double refracting crystal plates, the plates being secured on the inner sides of the prisms, and means for rotating the prisms through equal angles, but in opposite directions.

ALBERT KÖNIG.

Witnesses:
 PAUL KRÜGER,
 FRITZ SANDER.